US009479386B2

(12) United States Patent
Han et al.

(10) Patent No.: US 9,479,386 B2
(45) Date of Patent: Oct. 25, 2016

(54) SCHEME FOR DEVICE DISCOVERY AND P2P GROUP FORMATION

(71) Applicant: Samsung Electronics Co., Ltd., Gyeonggi-do (KR)

(72) Inventors: Se-Hee Han, Seoul (KR); Mayuresh Madhukar Patil, Gyeonggi-do (KR); Ji-Hye Lee, Seoul (KR); Jun-Hyung Kim, Gyeonggi-do (KR); Jong-Hyo Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 95 days.

(21) Appl. No.: 13/939,610

(22) Filed: Jul. 11, 2013

(65) Prior Publication Data
US 2014/0019513 A1 Jan. 16, 2014

Related U.S. Application Data

(60) Provisional application No. 61/670,378, filed on Jul. 11, 2012.

(51) Int. Cl.
H04L 29/08 (2006.01)
H04L 29/06 (2006.01)

(52) U.S. Cl.
CPC ..... *H04L 29/08531* (2013.01); *H04L 67/1046* (2013.01); *H04L 67/1051* (2013.01); *H04L 67/1061* (2013.01); *H04L 67/1063* (2013.01); *H04L 67/1068* (2013.01); *H04L 69/24* (2013.01)

(58) Field of Classification Search
CPC ....... H04L 63/10; H04L 67/16; H04L 69/24; H04W 8/002; H04W 76/002; H04W 76/023
USPC .......... 709/203, 206, 217, 223, 224
See application file for complete search history.

(56) References Cited

U.S. PATENT DOCUMENTS

| 8,559,340 | B2* | 10/2013 | Verma et al. ................. 370/255 |
| 8,848,559 | B2* | 9/2014 | Abraham et al. ............. 370/252 |
| 8,929,822 | B2* | 1/2015 | Jung et al. ................... 455/41.2 |
| 9,167,615 | B2* | 10/2015 | Lee ..................... H04W 76/023 |
| 2009/0239469 | A1 | 9/2009 | Rangarajan et al. |
| 2010/0271959 | A1* | 10/2010 | Qi ........................... H04L 41/12 370/248 |
| 2010/0322213 | A1* | 12/2010 | Liu et al. ...................... 370/338 |
| 2011/0034127 | A1* | 2/2011 | Wentink ............. H04W 76/022 455/41.2 |
| 2011/0082905 | A1* | 4/2011 | Wentink ................ H04W 84/20 709/205 |

(Continued)

FOREIGN PATENT DOCUMENTS

EP 2 448 366 5/2012
WO WO 2011/047115 4/2011

OTHER PUBLICATIONS

European Search Report dated Feb. 5, 2016 issued in counterpart application No. 13816126.0-1853, 8 pages.

*Primary Examiner* — Lashonda Jacobs
(74) *Attorney, Agent, or Firm* — The Farrell Law Firm, P.C.

(57) ABSTRACT

A method in which a first device forms a peer to peer (P2P) group with a second device is provided. The method includes sending an invitation request to the second device; and performing a negotiation process to form the P2P group with the second device if an invitation response to the invitation request is received from the second device. The invitation response includes device information identifying the second device. The negotiation process is performed using the device information.

12 Claims, 4 Drawing Sheets

(56) References Cited

U.S. PATENT DOCUMENTS

| | | |
|---|---|---|
| 2011/0082939 A1* | 4/2011 | Montemurro et al. ........ 709/227 |
| 2011/0093536 A1* | 4/2011 | Wentink ................ H04L 67/104 709/204 |
| 2011/0161697 A1* | 6/2011 | Qi et al. ......................... 713/320 |
| 2011/0258318 A1* | 10/2011 | Peng .................... H04L 47/781 709/226 |
| 2011/0276633 A1 | 11/2011 | Marchisio et al. |
| 2012/0044815 A1 | 2/2012 | Geirhofer et al. |
| 2012/0063335 A1 | 3/2012 | Cho et al. |
| 2012/0134349 A1* | 5/2012 | Jung .................... H04W 8/005 370/338 |
| 2012/0173620 A1* | 7/2012 | Holostov ............ H04L 67/1048 709/204 |
| 2012/0243524 A1* | 9/2012 | Verma ................. H04W 48/08 370/338 |
| 2012/0278389 A1* | 11/2012 | Thangadorai ......... H04W 84/20 709/204 |
| 2013/0034023 A1* | 2/2013 | Jung ............................. 370/255 |
| 2013/0065627 A1* | 3/2013 | Jung et al. .................... 455/515 |
| 2013/0185441 A1* | 7/2013 | Helaine ............... H04W 76/028 709/227 |
| 2014/0010107 A1* | 1/2014 | Chikkappa ............. H04W 4/06 370/254 |
| 2014/0016507 A1* | 1/2014 | Han et al. ..................... 370/254 |
| 2014/0016628 A1* | 1/2014 | McCann ............... H04W 4/001 370/338 |
| 2014/0068023 A1* | 3/2014 | Arickan ........................ 709/220 |
| 2014/0091987 A1* | 4/2014 | Lee et al. ....................... 345/2.3 |
| 2015/0009981 A1* | 1/2015 | Choi .................. H04W 76/023 370/338 |
| 2015/0117318 A1* | 4/2015 | Qi et al. ........................ 370/329 |
| 2015/0245393 A1* | 8/2015 | Lee ....................... H04W 8/005 370/338 |

* cited by examiner

SCHEME FOR DEVICE DISCOVERY AND P2P GROUP FORMATION

PRIORITY

This application claims priority under 35 U.S.C. §119(a) to a U.S. Provisional patent application filed on Jul. 11, 2012 in the U.S. Patent and Trademark Office and assigned Ser. No. 61/670,378, the entire disclosure of which is incorporated herein by reference.

BACKGROUND OF THE INVENTION

1. Field of the Invention

The present invention generally relates to schemes for device discovery and peer to peer (P2P) group formation, and more particularly, to a scheme for device discovery and P2P group formation based on an open service request.

2. Description of the Related Art

Recent Wireless Fidelity (Wi-Fi) technologies, e.g., IEEE 802.11 standard technologies, allow users to discover Access Points (APs) and/or other Wi-Fi device(s). With other devices discovered, the user, more specifically a terminal of the user, is connected to an AP and may communicate with the other devices through the AP.

Wi-Fi Direct, e.g., the Wi-Fi peer to peer (P2P) standard technology, may allow the user to be connected to a Wi-Fi device without the user's request for connection to an AP. The Wi-Fi Direct enables different P2P services to communicate with each other (e.g., file sharing, media sharing, etc.).

A device seeking to perform the Wi-Fi P2P communication has to form a P2P group session with any other device(s).

SUMMARY OF THE INVENTION

The present invention has been made to address at least the problems and disadvantages described above, and to provide at least the advantages described below. Accordingly, aspects of the present invention provide new group formations between a P2P device and a device already joining a P2P group.

An aspect of the present invention also provides a scheme for minimizing signaling occurrences in a process of forming a new P2P group and minimizing user efforts for an invitation mechanism used to form a group.

An aspect of the present invention also provides a scheme for allowing a device already joining an existing P2P group to receive a request from another device to join a new P2P group.

In accordance with an aspect of the present invention, there is provided a method in which a first device forms a peer to peer (P2P) group with a second device, the method including sending an invitation request to the second device; and performing a negotiation process to form the P2P group with the second device if an invitation response to the invitation request is received from the second device, wherein the invitation response includes device information identifying the second device, and wherein the negotiation process is performed using the device information.

In accordance with another aspect of the present invention, there is provided a first device configured to form a peer to peer (P2P) group with a second device, the first device including a controller configured to control an invitation request to be sent to the second device and to perform a negotiation process to form the P2P group with the second device if an invitation response to the invitation request is received from the second device; and a transceiver configured to transmit or receive wireless signals under control of the controller, wherein the invitation response includes device information identifying the second device, and wherein the controller performs the negotiation process using the device information.

BRIEF DESCRIPTION OF THE DRAWINGS

The above and other features and advantages of the present invention will become more apparent by describing in detail embodiments thereof with reference to the attached drawings in which.

DETAILED DESCRIPTION OF EMBODIMENTS OF THE PRESENT INVENTION

Figure 1:
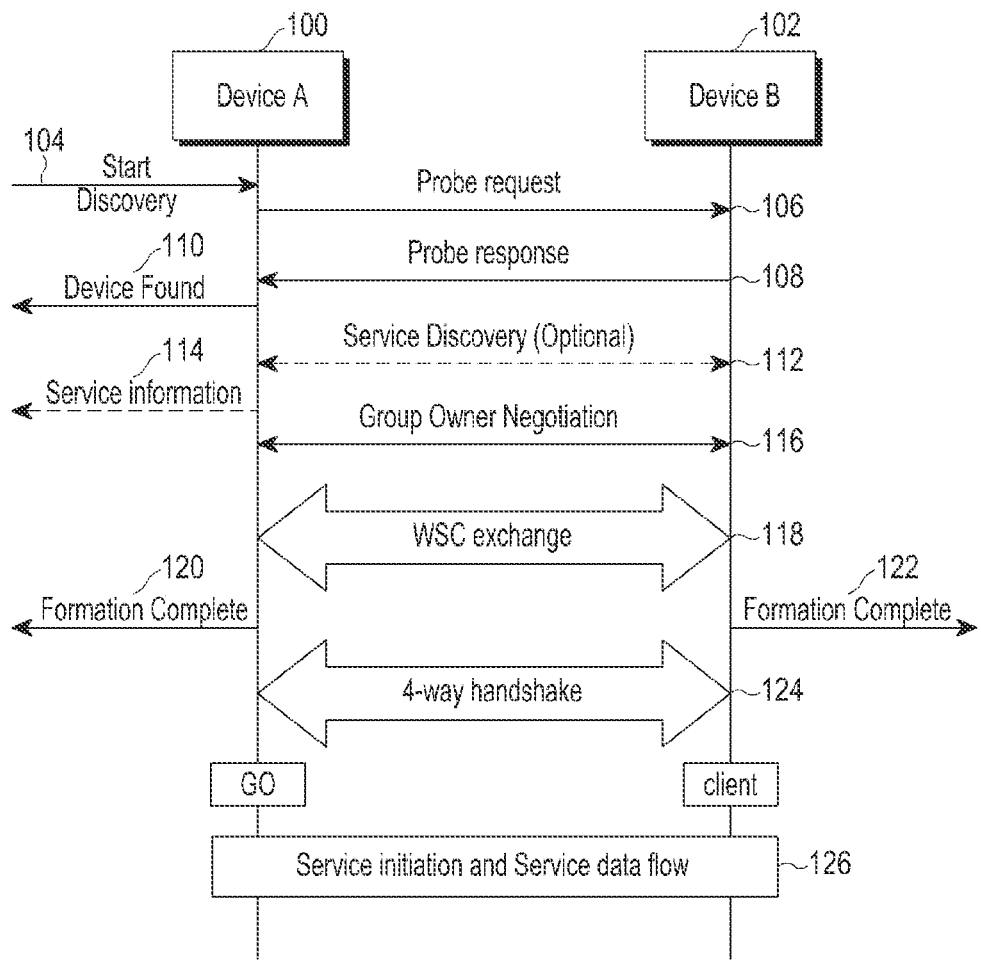
FIG. 1 illustrates a process of device discovery and peer to peer (P2P) group formation between devices, according to an embodiment of the present invention.

The following description with reference to the accompanying drawings is provided to assist in a comprehensive understanding of embodiments of the present invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness. Throughout the drawings, like reference numerals will be understood to refer to like parts, components, and structures.

The terms and words used in the following description and claims are not limited to their dictionary meanings, but are merely used by to enable a clear and consistent understanding of the present invention. Accordingly, it should be apparent to those skilled in the art that the following description of embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Prior to explaining the embodiments of the present invention, several terms used in this specification will be described first. However, it will be appreciated that those terms are not limited to what will be described below.

A device, as used in herein, is an entity configured to perform peer to peer (P2P) communications with another device, and may also be called a P2P device, a terminal, a user equipment (UE), a mobile station (MS), a mobile equipment (ME), a terminal, etc.

FIG. 1 illustrates a process of device discovery and P2P group formation between devices, according to an embodiment of the present invention.

In step 104, a device A 100 starts discovery. In step 106, the device A 100 sends a device B 102 a probe request. In step 108, the device B 102 sends a probe response to the device A 100 in response to the probe. In step 110, the device A 100 finds the device B 102 based on the probe response.

Alternatively, the device A 100 and device B 102 may further exchange signals for service discovery in step 112. By doing this, the device A 100 may exchange or share service information with the device B 102 in step 114.

After exchange of the probe signals in steps 106 and 108, the device A 100 and device B 102 perform group owner negotiation in step 116. In the embodiment of FIG. 1, the device A 100 is a group owner (GO) and the device B 102 is a client. It should be noted, however, that the device A 100 may be the client and the device B 102 may be the GO.

Subsequently, in step 118 the device A 100 and the device B 102 perform a Wi-Fi Simple Configuration (WSC) Exchange and complete connection formation in steps 120 and 122, respectively. The device A 100 and the device B 102 then perform a 4-way handshake in step 124.

By doing this, a new P2P group is formed between the device A 100 and the device B 102. Then, in step 126, service initiation is performed and service data flow is transferred between the device A 100 and the device B 102.

A P2P group may include a device which is a GO that serves as an access point (AP). A device may discover another device that has already joined an existing P2P group. The device may attempt to connect to the other device that has already joined the existing P2P group by sending the other device a discoverability request and an invitation request. A process of forming a new P2P group with the another device will now be described in connection with FIG. 2.

Figure 2:
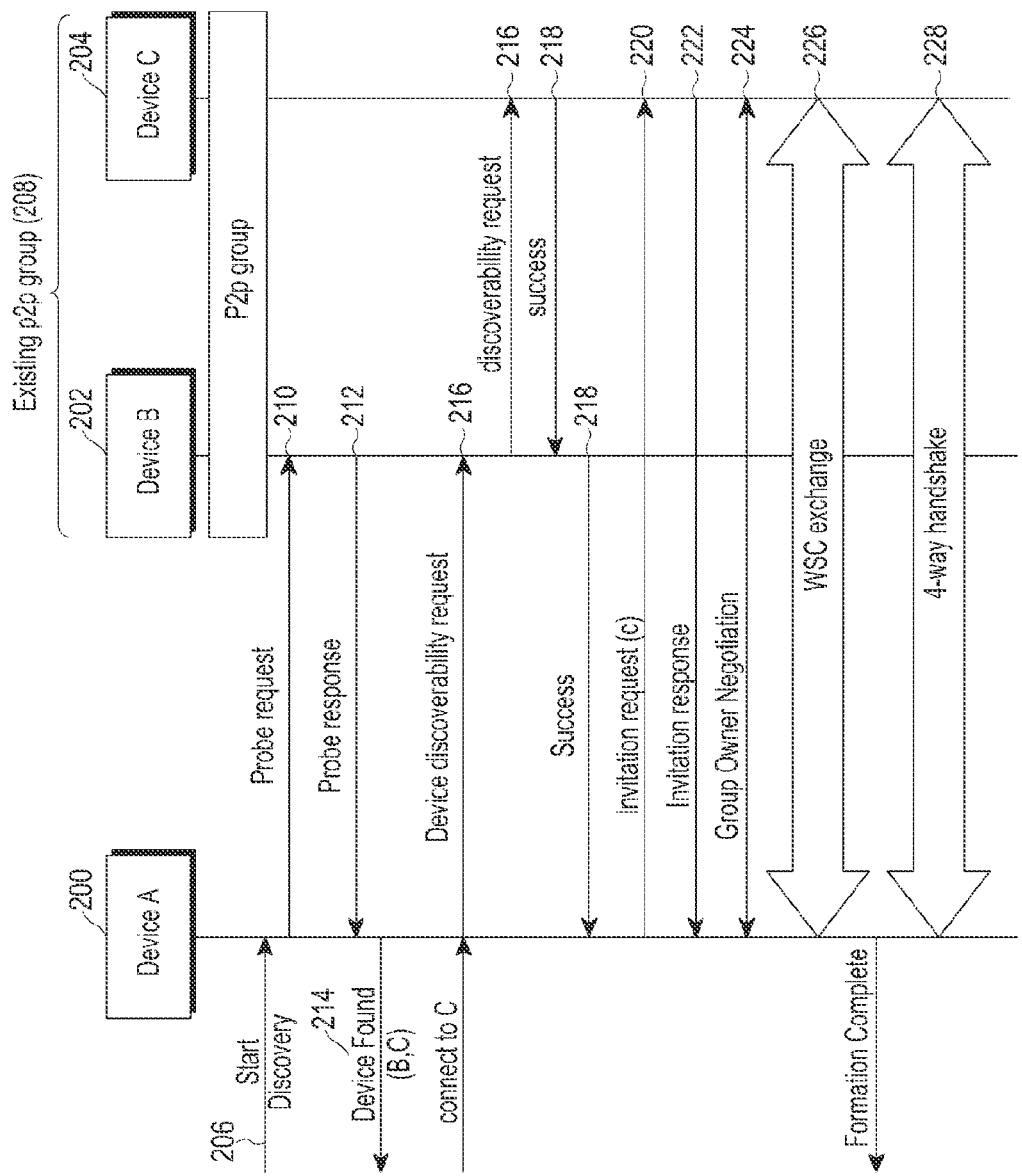
FIG. 2 illustrates a process of device discovery and P2P group formation between devices, some of which belong to an existing group, according to an embodiment of the present invention.

FIG. 2 illustrates a process of device discovery and P2P group formation between devices, some of which belong to an existing group, according to an embodiment of the present invention.

In this description, it will be assumed that a device B 202 and a device C 204 have already formed an existing P2P group 208 and that a device A 200 wants to connect to the device C 204.

The device A 200, which starts discovery in step 206, sends the device B 202, which is a GO of the existing P2P group 208, a probe request in step 210. In step 212, the device B 202 sends the device A 200 a probe response. Subsequently, in step 214, the device A 200 finds the device B 202 and the device C 204 in step 214 based on the probe response from the device B 202.

The device A 200 that wants to connect to the device C 204 may employ a discoverability mechanism and an invitation mechanism.

Specifically, the discoverability mechanism may include transmission, by the device A 200, of a discoverability request (or a device discoverability request) to the device C 204 through the device B 202 in step 216 and receiving a response to the discoverability request, also through the device B 202, from the device C 204 in step 218.

The invitation mechanism may include transmission, by the device A 200, to the device C 204, of an invitation request for joining a new P2P group in step 220 and receiving an invitation response from the device C 204 in step 222. A message of the invitation request includes information to specify the device C 204 (e.g., the device ID: c) as a destination.

As such, if the discoverability mechanism and the invitation mechanism are performed, the device A 200 forms the new P2P group by performing group owner negotiation in step 224, WSC exchange in step 226, and four-way handshake in step 228.

In this regard, the device C 204 may terminate the existing P2P group 208 with the device B 202 and join the new P2P group, or may instead join both groups, i.e., the existing P2P group with the device B 202 and the new P2P group with the device A 200.

A device that has already joined a P2P group may not recognize a new group unless (1) the device is explicitly disconnected from the existing P2P group or (2) an owner of another P2P group explicitly invites the device.

Thus far, it is presently impossible for a user to send an open service request to all users (since any specific method to support this does not exist). However, since it is possible that any other interested user may want to join another P2P group, a need exists for such an open service request. An open service request is a service request that does not specify a party to be requested, i.e., a requestee. In other words, the open service request is a service request that a device sends to any devices that may possibly be the device's clients by forming a P2P group together. The open service request may include an open invitation request, for example, as described below.

Operations for a device to form a new P2P group by sending requests to devices that are joining another P2P group requires many signalings. This is because the device sends discoverability and invitation requests to all candidate clients. In other words, it is a time- and power-consuming process.

In an embodiment of the present invention, a generic mechanism enables a user (i.e., a device of the user) to send the open service request to a nearby peer device, which may in turn respond to the open service request to join in, thus forming a P2P group session with these devices.

In another embodiment of the present invention, a mechanism enables a P2P device that is joining an existing P2P group to receive notification of a newly formed P2P group session. With this mechanism, the P2P device may join the new P2P group.

In an embodiment of the present invention, the invitation request message, to be sent from a device to another device to form a P2P group together, is expanded to be used to send the open invitation request.

More specifically, an invitation flag bitmap included in the invitation request message is expanded, as shown in Table 1 below, to be used as the open invitation request.

TABLE 1

| Bit Sequence | Bit Value/Description |
| --- | --- |
| 0 | '0': indicates whether it is a request for invitation to a new group |
| 1 | '1': indicates whether it is an open invitation request |

The invitation flag bitmap may include, e.g., 2 bits.

The first bit (bit 0) of the invitation flag bitmap may be used to indicate whether the invitation request is a request for invitation to a new group. For example, if the bit 0 is set to be '0', it may indicate that the invitation request is a new group invitation request.

The second bit (bit 1) of the invitation flag bitmap may be used to indicate whether the invitation request is the open invitation request. For example, if the bit 1 is set to be '1', it may indicate that the invitation request is the open invitation request.

Furthermore, a message of the invitation response may be expanded to include a device info attribute of a P2P device. The device info attribute includes information regarding a device (e.g., a device ID) which is interested in the open invitation request. As a result, the device that sent the invitation request may know which device is interested in its invitation request.

Figure 3:
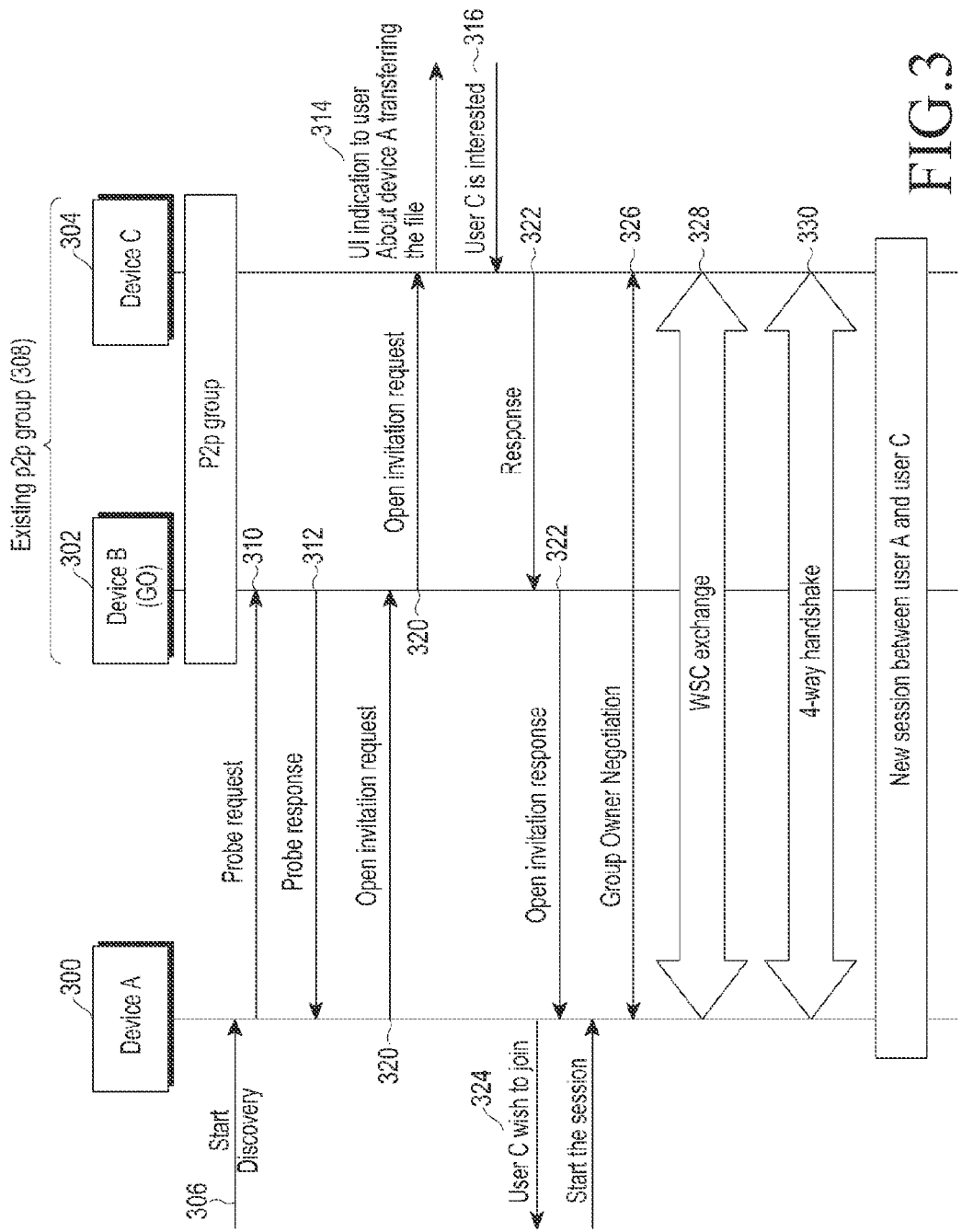
FIG. 3 illustrates a process of device discovery and P2P group formation between devices, some of which belong to an existing group, according to another embodiment of the present invention.

FIG. 3 illustrates a process of device discovery and P2P group formation between devices, some of which belong to an existing group, according to another embodiment of the present invention.

In this description, it will be assumed that a device B 302 and a device C 304 have already formed an existing P2P group 308 and that a device A 300 wants to connect to any other unspecified device (or to form a P2P group session).

The device A 300, which starts discovery in step 306, sends the device B 302, which is a GO of the existing P2P group 308, a probe request in step 310. In step 312, the device B 302 sends a probe response to the device A 300. Subsequently, the device A 300 finds the device B 302 and the device C 304 based on the probe response from the device B 202.

The device A 300, which wants to connect to any other device, only performs the invitation mechanism and not the discoverability mechanism (i.e., without sending the discoverability request to the other device and receiving a response to the discoverability request). In other words, the device A 300 sends the open invitation request to the discovered other unspecified devices to join its P2P group in step 320 without sending the discoverability request, and then waits for reception of an open invitation response to the open invitation request. The open invitation request to the other devices may be passed through the device B 302, which is the GO of the existing P2P group 308.

According to the embodiment of the present invention, the device A 300, to form a group with another device, does not have to send the discoverability request, but needs to send the open invitation request only once without sending as many invitation requests as there are other devices, thus reducing signaling overhead and minimizing the user effort to send the invitation request (i.e., the number of invitation requests does not need to be equal to the number of other devices). Since the open invitation request is sent to all neighboring (or nearby) devices found by the device with probe operations, some devices that have already joined an existing group session may also receive the invitation to form a new group. This openness of invitation allows various users to join in without restriction, which leads to revitalization of P2P communication.

As described above, the invitation flag bitmap, included in the open invitation request, may include two bits: one bit indicating whether the invitation request is a request for invitation to a new group and the other bit indicating whether the invitation request is the open invitation request. In this embodiment, the device A 300 may send the open invitation request by setting the second bit of the invitation flag bitmap to be '1'.

In step 314, the other devices that receive the open invitation request may provide indications about a service (or a file) provided by the device that transmitted the open invitation request using their user interfaces (UIs) i to let their users know of the service (or the file). If one of the users of the other devices enters an input communicating the user's interest in the service (or the file) with its UI in step 316, the device of the user (e.g., the device C 304) sends an open invitation response to the open invitation request to the device A 300, in step 322. The open invitation response may be sent to the device A 300 through the device B 302, the GO of the existing P2P group 308.

A message of the open invitation response may include a device info attribute of the P2P device, and the device C 304 may indicate that it is interested in the open invitation request by including its device ID in the device info attribute.

Upon reception of the open invitation response, the device A 300 may check for a joining intention of the device C 304 in step 324.

As described above, if the invitation mechanism is performed (without the discoverability mechanism), the device A 300 and the device C 304 may further perform a negotiation process to form a P2P group session.

The negotiation process to form a P2P group session may include operations, such as group owner negotiation in step 326, WSC exchange in step 328, and four-way handshake in step 330. By performing these operations, a new P2P group session is formed and a service (or a file) data flow may be transferred.

Figure 4:
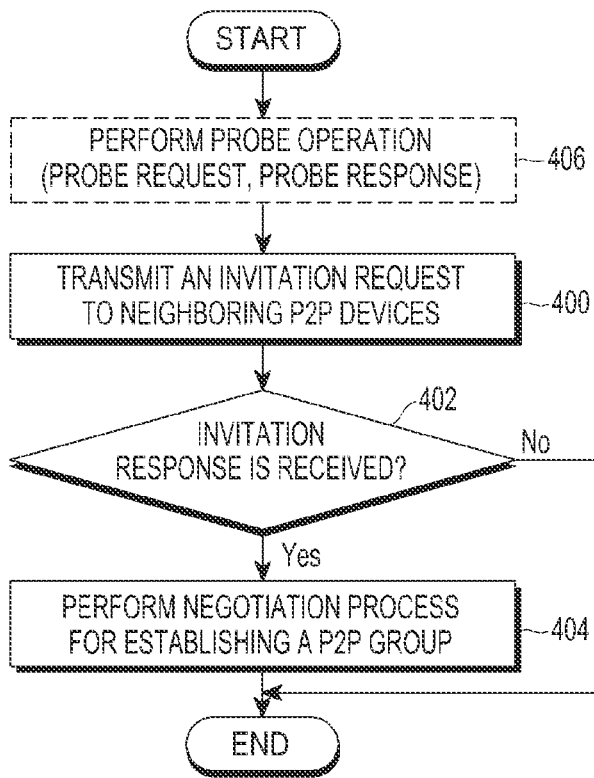
FIG. 4 is a flowchart illustrating a method of a P2P device performing an invitation mechanism to form a P2P group with another P2P device, according to an embodiment of the present invention.

FIG. 4 is a flowchart illustrating a method of a P2P device performing an invitation mechanism to form a P2P group with another P2P device according to an embodiment of the present invention.

In step 400, the P2P device sends an invitation request to neighboring unspecified P2P devices. The invitation request may include an invitation flag bitmap that has, for example, two bits: one bit indicating whether the invitation request is the open invitation request and the other bit indicating whether the invitation request is a request for invitation to a new group.

If, in step 402, it is determined that the P2P device receives an invitation response from the at least one neighboring P2P device in response to the invitation request in, the P2P device may perform a negotiation process to form the P2P group with the at least one neighboring P2P device in step 404. The at least one neighboring P2P device that receives the invitation response may have already joined another existing P2P group. The invitation response may include device information to identify the device that sent the invitation response, such as a device ID. The device ID may be inserted into the invitation response as a P2P device info attribute.

The negotiation process to form the P2P group may include one or more of e.g., group owner negotiation, WSC exchange, and four-way handshake.

Alternatively, before sending the invitation request in step 400, the P2P device may further perform, in step 406, operations of sending the probe request to any neighboring P2P device and receiving the probe response in return. With the probe response, the P2P device may discover neighboring devices.

Figure 5:
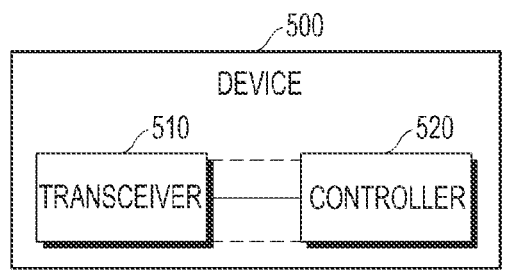
FIG. 5 is a block diagram of a P2P device, according to an embodiment of the present invention.

FIG. 5 is a block diagram of a P2P device, according to an embodiment of the present invention.

A P2P device 500 may include a controller 520, which is configured to control general operations for P2P group formation including the device's invitation mechanism, and a transceiver 510, which is configured to communicate wireless signals with neighboring devices under control of the controller 520.

The controller 520 controls operations of the P2P device 500 as described above. Specifically, the controller controls an invitation request to be sent to neighboring P2P devices, and performs a negotiation process to form a P2P group with at least one neighboring P2P device if an invitation response to the invitation request is received from the at least one neighboring P2P device. In the present invention, operations of a device may be understood to be performed by the device's controller.

The transceiver 510 and the controller 520 may be implemented separately as a Radio Frequency (RF) module and a processor, respectively, or may be incorporated in a single module.

In accordance with an embodiment of the present invention, provided is a method of a first peer to peer (P2P) device performing an invitation mechanism to form a P2P group with at least one second P2P device among neighboring P2P devices, the method including sending an invitation request toward the neighboring P2P devices; and performing a negotiation process to form the P2P group with the at least one second P2P device if an invitation response to the invitation request is received from the at least one second P2P device, wherein the invitation response includes device information to identify a device that transmits the invitation response, and wherein the negotiation process is performed using the device information.

In accordance with an embodiment of the present invention, provided is a first peer to peer (P2P) device for performing an invitation mechanism to form a P2P group with at least one second P2P device among neighboring P2P devices, the first P2P device including a controller for controlling an invitation request toward the neighboring P2P devices and performing a negotiation process to form the P2P group with the at least one second P2P device if an invitation response to the invitation request is received from the at least one second P2P device; and a transceiver for transmitting or receiving wireless signals under control of the controller, wherein the invitation response includes device information to identify a device that transmits the invitation response, and wherein the controller performs the negotiation process using the device information.

The aforementioned connecting operations between the devices through formation of a new group may also be applied to following examples.

EXAMPLE 1

In this example, it will be assumed that a student who is taking a class in a classroom wishes to share a learning material.

Specifically, student 1 is taking an art class where students share information through Wi-Fi direct connection. The student 1 may want to share a small part of his/her picture in the classroom. The student 1 may send a file sharing request around the classroom in the form of the open invitation request. Students 2 and 3 are interested in viewing pictures and want to join a file sharing group of the student 1. Devices of the students 2 and 3 each send a response (i.e., an open invitation response) to the file sharing request. Then the student 1 gets notification from his/her device that students 2 and 3 are interested in his/her file. Finally, the student 1 initiates or forms the file sharing group and sends the file to students 2 and 3.

EXAMPLE 2

This example relates to online shopping.

A shop in a shopping mall sends the open invitation request to a user (i.e., user's device) who is looking around the shopping mall online, and the user may respond that he/she wants to join. Then the shop may send advertisements in the form of video podcasts or audio/visual streams to users who join a WiFi P2P group of interest.

In the shopping mall, many dynamic groups may be formed, from which a simple advertisement of a new group may interest users.

According to embodiments of the present invention, signaling overhead, in connection between two peer devices to form a new group, may be reduced while one of the peer devices is joining an existing group.

In addition, the user may send an open service request to all neighboring devices with one-time action, thereby increasing user convenience.

Furthermore, all users may receive new group information without limitation even while they are joining a different group session, thus offering a communication environment in which it is easy to collect new information.

It should be noted that aforementioned description in connection with FIGS. 1 to 5 illustrates embodiments of the present invention and should not be used to intend to limit the scope of the present invention. In this respect, all the signal flows, operations, or units illustrated in FIGS. 1 to 5 should not be interpreted as essential elements to implement the present invention, and more or fewer of them may be used to implement the present invention within the scope of the present invention.

The aforementioned device operations may be implemented by program codes stored in a storage medium equipped in the device. In other words, the controller of the device may perform the aforementioned operations by reading out and executing the program codes with a processor or a Central Processing Unit (CPU).

Various components and modules of the device may be implemented in hardware, such as Complementary Metal Oxide Semiconductor (CMOS)-based logic circuits, firmware, software, or a combination thereof. For example, they may be performed using electrical circuits, such as transistors, logic gates, and Application Specific Integrated Circuits (ASICs).

Several embodiments have thus been described, but it will be understood that various modifications can be made without departing the scope of the present invention. Thus, it will be apparent to those ordinary skilled in the art that the invention is not limited to the embodiments described, but can encompass not only the appended claims but the equivalents.

What is claimed is:

1. A method in which a first device forms a peer to peer (P2P) communication group with a second device, the method comprising:

sending, by the first device, an invitation request to any other devices; and performing, by the first device, a negotiation process to form the P2P communication group with the second device if an invitation response to the invitation request is received from the second device among the any other devices, wherein the invitation response includes device information identifying the second device, wherein the negotiation process is performed using the device information, and wherein the invitation request comprises an invitation flag bitmap, a first bit of which indicates whether the invitation request is an open invitation request.

2. The method of claim 1, wherein a second bit of the invitation flag bitmap indicates whether the invitation request is a request for invitation to a new group.

3. The method of claim 1, wherein the second device has already joined another existing P2P communication group.

4. The method of claim 1, wherein the device information comprises a P2P communication device info attribute included in the invitation response.

5. The method of claim 1, further comprising: prior to sending the invitation request,
sending a probe request to at least one of a plurality of neighboring devices; and
receiving a probe response from the at least one of the plurality of neighboring devices, and
discovering the second device based on information included in the probe response.

6. The method of claim 1, wherein the negotiation process comprises at least one of group owner negotiation, Wi-Fi Simple Configuration (WSC) exchange, and four-way handshake.

7. A first device configured for forming a peer to peer (P2P) communication group with a second device, the first device comprising:
a controller configured for controlling an invitation request to be sent to any other devices and to perform a negotiation process to form the P2P communication group with the second device if an invitation response to the invitation request is received from the second device among the any other devices; and
a transceiver configured for transmitting or receive wireless signals under control of the controller,
wherein the invitation response includes device information identifying the second device,
wherein the controller performs the negotiation process using the device information, and wherein the invitation request comprises an invitation flag bitmap, a first bit of which indicates whether the invitation request is an open invitation request.

8. The first device of claim 7, wherein a second bit of the invitation flag bitmap indicates whether the invitation request is a request for invitation to a new group.

9. The first device of claim 7, wherein the second device has already joined another existing P2P communication group.

10. The first device of claim 7, wherein the device information comprises a P2P communication device info attribute included in the invitation response.

11. The first device of claim 7, wherein the controller, prior to sending the invitation request, sends a probe request to at least one of a plurality of neighboring devices; and receives a probe response from the at least one of the plurality of neighboring devices, and discovers the second device based on information included in the probe response.

12. The first device of claim 7, wherein the negotiation process comprises at least one of group owner negotiation, Wi-Fi Simple Configuration (WSC) exchange, and four-way handshake.

\* \* \* \* \*